US012452303B2

(12) United States Patent
Castro

(10) Patent No.: US 12,452,303 B2
(45) Date of Patent: *Oct. 21, 2025

(54) PHISHING EMAIL CAMPAIGN IDENTIFICATION

(71) Applicant: CLOUDFLARE, INC, San Francisco, CA (US)

(72) Inventor: Javier Castro, Kensington, MD (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/433,090

(22) Filed: Feb. 5, 2024

(65) Prior Publication Data

US 2024/0179180 A1    May 30, 2024

Related U.S. Application Data

(63) Continuation of application No. 17/574,443, filed on Jan. 12, 2022, now Pat. No. 11,895,151.

(51) Int. Cl.
| | | |
|---|---|---|
| *H04L 9/40* | (2022.01) | |
| *H04L 51/212* | (2022.01) | |
| *H04L 9/06* | (2006.01) | |
| *H04L 9/08* | (2006.01) | |
| *H04L 9/32* | (2006.01) | |

(52) U.S. Cl.
CPC ........ *H04L 63/1483* (2013.01); *H04L 51/212* (2022.05); *H04L 63/12* (2013.01); *H04L 63/123* (2013.01); *H04L 63/1416* (2013.01); *H04L 63/1425* (2013.01); *H04L 9/0643* (2013.01); *H04L 9/0894* (2013.01); *H04L 9/3239* (2013.01)

(58) Field of Classification Search
CPC ... H04L 63/1483; H04L 51/212; H04L 63/12; H04L 63/123; H04L 63/1416; H04L 63/1425; H04L 9/0643; H04L 9/0894; H04L 9/3239

See application file for complete search history.

(56) References Cited

U.S. PATENT DOCUMENTS

| | | | |
|---|---|---|---|
| 11,785,052 B2 | 10/2023 | Kothekar et al. | |
| 2007/0143851 A1* | 6/2007 | Nicodemus | G06F 11/3495 726/4 |
| 2016/0321255 A1 | 11/2016 | Granacher et al. | |

(Continued)

OTHER PUBLICATIONS

Notice of Allowance, U.S. Appl. No. 17/574,443, Dec. 15, 2023, 25 pages.

*Primary Examiner* — Cheng-Feng Huang
(74) *Attorney, Agent, or Firm* — NICHOLSON DE VOS WEBSTER & ELLIOTT LLP

(57) ABSTRACT

A computer-implemented method, executed by one or more email detection computers, receives from a computer network, a first email message from a first sender account to a first recipient account and having a plurality of attributes. The method determines that the first email message is a phishing email, extracts a subset of attributes, normalizes transformable attributes, and generates a hash representation from fixed attributes and the normalized transformable attributes, stores the hash representation in a database, receives a second email message, and determines that the second email message is a phishing email based on the stored hash representation.

20 Claims, 4 Drawing Sheets

(56) References Cited

U.S. PATENT DOCUMENTS

| | | | |
|---|---|---|---|
| 2017/0251006 A1* | 8/2017 | LaRosa | H04L 63/1441 |
| 2017/0366582 A1 | 12/2017 | Kothekar et al. | |
| 2018/0091453 A1* | 3/2018 | Jakobsson | H04L 63/1483 |
| 2018/0191754 A1 | 7/2018 | Higbee et al. | |
| 2018/0288071 A1* | 10/2018 | Ikeda | H04L 63/145 |
| 2018/0324201 A1* | 11/2018 | Lowry | H04L 63/1441 |

* cited by examiner

PHISHING EMAIL CAMPAIGN IDENTIFICATION

CROSS-REFERENCE TO RELATED APPLICATIONS

This application is a continuation of application Ser. No. 17/574,443, filed Jan. 12, 2022, which is hereby incorporated by reference.

TECHNICAL FIELD

One technical field of the present disclosure is computer security techniques applicable to computers that send and receive email messages over a network, specifically computer-implemented processes and computer systems that are programmed to detect malicious emails, phishing, or malware and find patterns in the emails.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of the largest threats to computing devices includes malicious messages, including electronic mail, that are sent over a network. Often these threats appear in the form of a message containing attachments with malicious code and/or hyperlinks to malicious uniform resource locators (URLs). The malicious code and/or malicious URLs may cause a computing device to download viruses, to send personal data to other computing devices, or to encrypt files, resulting in direct or indirect losses of time, money, or productivity to individuals or organizations.

Due to the increased usage of email messaging and the increased threat of malicious messages, message security has become extremely important for computing devices. Many messaging security systems can analyze hyperlinks and attachments to determine if they contain any known viruses or links to known malicious URLs.

While virus scanners may identify malicious attachments in messages, many types of malicious messages are more difficult to identify. A malicious message may include no attachments or hyperlinks, but instead convince the recipient to send a response or to perform a particular action. For instance, a malicious message may identify the sender as a security company and request remote access to the computing device of the recipient to fix an invented problem with the computing device. These types of messages, also known as phishing messages, are more difficult to identify as malicious as they may not contain URLs or attachments.

The malicious message problem is most prevalent in email systems as identifiers of recipient e-mail accounts are readily available. The malicious message problem additionally exists in various messaging services, such as dating applications where fake accounts may be easily generated for sending phishing messages.

One solution to the malicious message problem is to track the names of messaging accounts that have sent out phishing messages. If a computing device can determine that a message has been sent to many recipients or that a messaging account has sent out phishing messages in the past, the account and/or the domain for the account may be added to a blacklist. Future messages received from a blacklisted account may be immediately quarantined or deleted, thereby protecting the computing device associated with the recipient account.

The approach of blacklisting known phishing accounts was most effective when messaging accounts were relatively difficult to obtain. As storage capacity has increased, messaging account providers have made the process of obtaining a messaging account relatively simple. Thus, the prior approach of identifying phishing accounts based on the number of messages they have sent can be overcome by obtaining individual accounts for sending a relatively small number of phishing messages. If an account has only sent a single message, the account may be identified as having a clean sending reputation even though the account was created for sending a malicious message.

Thus, there is a need for a system or method which can identify phishing accounts and/or malicious messages originating from a newly generated account with a clean sending reputation. Messages that are sent from accounts with a clean sending reputation are sometimes sent as part of phishing campaigns.

SUMMARY

The appended claims may serve as a summary of the invention.

DETAILED DESCRIPTION

Figure 1:
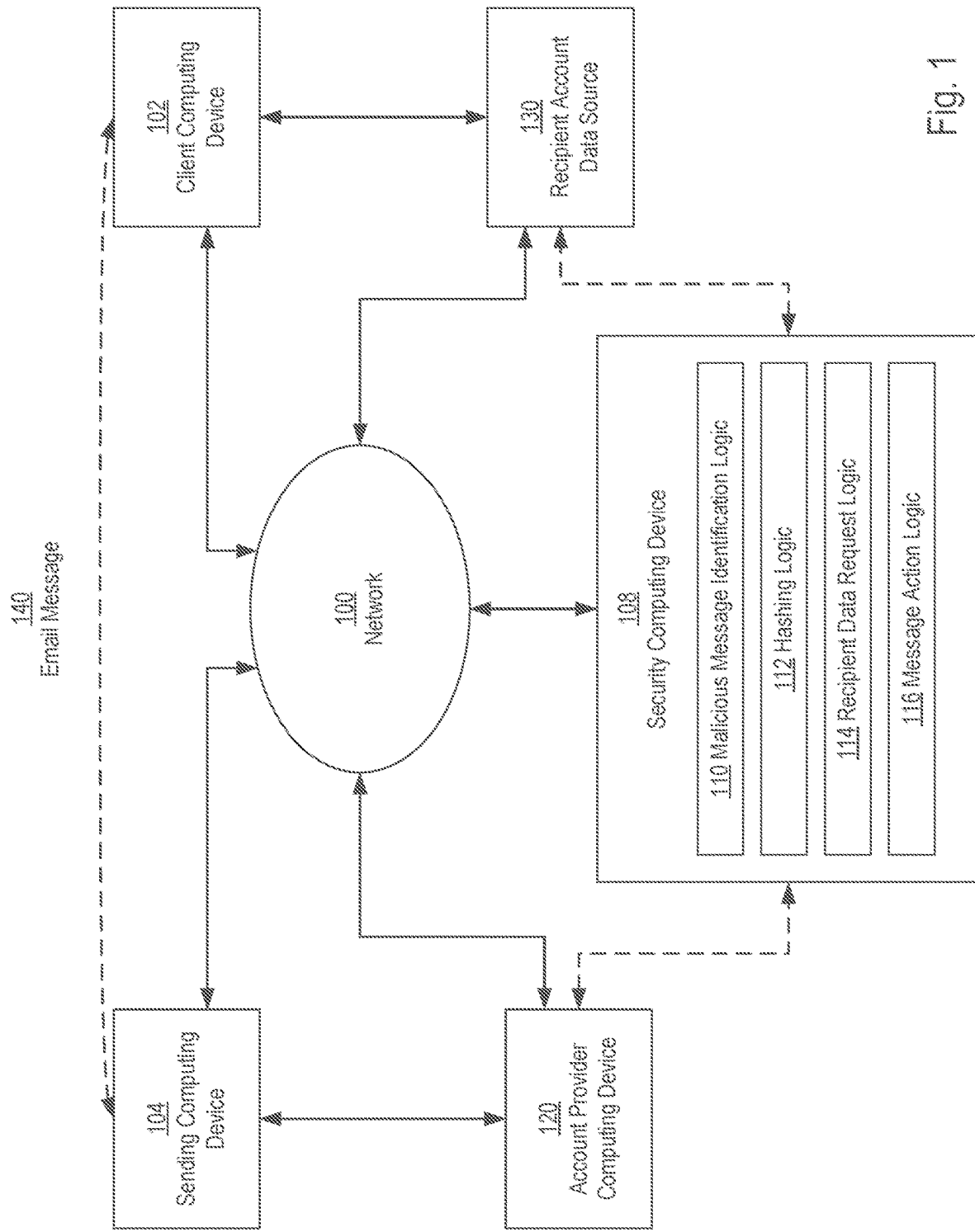
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:

1. General Overview
2. Structural Overview

3. Functional Overview
4. Implementation Example—Hardware Overview

1. General Overview

Although malicious phishing emails have become more sophisticated over time, phishing campaigns usually contain multiple emails that are superficially different but that bear similarities to each other. Phishing campaigns involve an attacker sending phishing emails out to multiple recipients. In an attempt both to present a more convincing trap and to avoid detection by security programs, these emails may have slight differences. If a security system classifies one email as being malicious and an identical email later moves through the system, the identical email will quickly be identified as also being a malicious phishing email. However, emails that are part of the same malicious phishing campaign often follow the same pattern without being identical. Given these patterns, it is possible to identify emails that are part of the same malicious phishing campaign through a process of normalizing particular values and creating a hash value to represent the emails. Executing a hash algorithm over different emails, after normalization of the particular values, will yield the same hash value. Therefore, the hash value can be used for rapid comparison to subsequent emails that are slightly different but normalize to the same values.

Systems and methods for identifying phishing accounts and/or malicious messages as being part of a phishing campaign are described herein. According to an embodiment, a computing device receives a first email message directed to a first recipient account. The first email message may contain values of multiple attributes as well as metadata. The computing device may use one or more of a variety of methods to determine whether the first email message is a phishing message. In some embodiments, these methods may read and process the attributes and/or the metadata associated with the first email message. Rather than hashing entire emails, an embodiment comprises executing a one-way hash algorithm over particular logical sections of an email, ignoring sections that are either unlikely to be changed between phishing campaigns, or likely to be changed as part of the same phishing campaign. Embodiments can be programmed to focus processing on sections which are known or determined to be likely to be the same or follow the same pattern within a particular phishing email campaign. In one embodiment, relevant portions for processing are identified by comparing multiple emails determined as phishing emails and identifying portions and aspects that are substantially similar using a trained machine learning classifier capable of conducting feature detection or classification.

Consequently, embodiments can beneficially reduce the resources required to perform hashing by processing only sections that are substantially similar or are known or determined to be likely to be the same or follow the same pattern within a particular phishing email campaign. Furthermore, orchestrators of phishing campaigns are less likely to avoid detection by making simple and insignificant changes to emails.

In an embodiment, a method for identifying phishing emails from a malicious email campaign is executed by one or more email detection computers. The method may involve, first, receiving a first email. The first email is associated with a first sender account and is directed to a first recipient account. The first email has or is associated with one or more attributes. At some point before or after the first email is received by the first recipient account, a computer-implemented process executes to determine whether the first email is a phishing email. In an embodiment, if the first email is determined to be a phishing email, then the process is programmed to extract a subset of the one or more attributes associated with the first email from the first email. The subset of attributes may include fixed attributes and/or transformable attributes. Fixed attributes may be those determined to be unlikely to change between phishing campaigns. Transformable attributes may be those determined to be likely to be changed as part of the same phishing campaign.

In an embodiment, each transformable attribute is transformed to a normalized representation of that attribute in accordance with rules set for that particular type of transformable attribute.

In an embodiment, after each transformable attribute considered in the subset of attributes is transformed to a normalized representation of the attribute, a hash representation is generated, representing the subset of the one or more attributes based on both the one of more fixed attributes and/or the normalized representations of the one or more transformable attributes.

In some embodiments, the hash representation of the subset of the one or more attributes of the first email message is stored in a database.

In some embodiments, the method involves receiving a second email message. The second email message may be directed to a second recipient, which recipient may be the same or different than the first recipient. The second email message may have been sent from a second sender account, which sender account may be the same or different than the first sender account. In some embodiments, a hash representation is generated for the second email message using a process similar to the process used to generate the hash representation for the first email message. After the hash representation has been generated for the second email message, it can be compared to hash representations for known phishing emails stored in the database. In some embodiments, the second email message is determined to be a phishing email based on the hash representation generated for the first email message.

In some embodiments, after and in response to the determination that the second email message is a phishing email, the method further involves execution of a particular responsive action for the second email. The particular responsive action may be one that is part of a program set to respond to emails that have been designated as phishing emails. In an embodiment, the particular responsive action may be blocking forwarding the second email message, moving the second email message to quarantine, transmitting an alert to the first recipient account, dropping the second email message, or deleting the second email message.

2. Structural & Functional Overview

In the following description a method and system is described for identifying phishing emails from a malicious email campaign to address the need for protecting computers against attacks, where the attacks follow the same pattern. Previous methods look for generic patterns in emails sent from one computer to another, where certain patterns are known to make it more likely that a particular email message is a malicious phishing message. In contrast, the present method identifies patterns specific to a particular phishing campaign.

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

In the example FIG. 1, a client computing device 102, a sending computing device 104, a security computing device 108, an account provider computing device 120, and a recipient account data source 130 are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The client computing device 102, sending computing device 104, security computing device 108, account provider computing device 120, recipient account data source 130, and other elements of the system may each comprise an interface compatible with the network 100 and are programmed or configured to use standardized protocols for communication across the networks such as TCP/IP, Bluetooth, and higher-layer protocols such as HTTP, TLS, and the like. Solid lines in FIG. 1 specify direct or indirect communication links of functional elements; broken lines in FIG. 1 indicate logical paths of communication of elements.

FIG. 1 depicts client computing device 102, sending computing device 104, security computing device 108, account provider computing device 120, and recipient account data source 130 in FIG. 1 for the purpose of illustrating a clear example. However, in other embodiments, more or fewer computers may accomplish the functions described herein. For example, security computing device 108 may interact with account provider computing device 120, recipient account data source 130, both account provider computing device 120 and recipient account data source 130, or neither of them. As another example, tasks described herein as being performed by security computing device 108 may be performed by client computing device 104.

Client computing device 102 is a computer that includes hardware capable of communicatively coupling client computing device 102 to one or more other computers, such as sending computing device 104 and/or security computing device 108 over one or more service providers. For example, client computing device 102 may include a network card that communicates with sending computing device 104 and/or security computing device 108 through a home or office wireless router (not illustrated in FIG. 1) coupled to an internet service provider. Client computing device 102 may be a smart phone, personal computer, tablet computing device, PDA, laptop, or any other computing device capable of transmitting and receiving information and performing the functions described herein.

Sending computing device 104 may be any computing device capable of sending a message over a network to client computing device 102. Sending computing device 104 may be any of a smart phone, personal computer, tablet computing device, PDA, laptop, or any other computing device capable of transmitting information.

In an embodiment, sending computing device 104 sends an electronic digital message 106 to client computing device 102 using a mail transfer agent (MTA), simple mail transfer protocol (SMTP) server or software or a similar facility. The message may conform to one or more messaging protocols, such as instant messaging protocols, SMTP for email, and/or short message service (SMS) messages. The electronic digital message may originate from a messaging account associated with sending computing device 104. For example, when the message is an SMS message, the messaging account may be a phone number of a cellular phone. As another example, when the message is an email message, the messaging account may comprise an email address from which the message was sent.

Security computing device 108 may be implemented using a server-class computer or other computer having one or more processor cores, co-processors, or other computers. In some embodiments, security computing device 108 may also include a client computing device, such as a smart phone and/or laptop computer. Security computing device 108 may provide one or more security applications to client computing device 102. While FIG. 1 depicts an email message 140 sent from sending computer device 104 directly to client computing device 102 for depicting a clear example, in other embodiments security computing device 108 may receive the email message 140 either directly or indirectly from sending computing device 104.

Security computing device 108 additionally stores modules, which may include malicious message identification logic 110, hashing logic 112, recipient data request logic 114, and message action logic 116. Malicious message identification logic 110, hashing logic 112, recipient data request logic 114, and message action logic 116 may each comprise a set of one or more pages of main memory, such as RAM, in a computing device into which executable instructions have been loaded and which when executed cause the computing device to perform the functions or operations that are described herein with reference to the modules. For example, the hashing logic 112 may comprise a set of pages in RAM that contain instructions which when executed cause the security computing device 108 to perform a hashing function, resulting in a hash representation which is then used as part of a method for identifying emails which are part of a malicious phishing campaign, such as the example method described in FIG. 3. The hashing logic may be accompanied by comparison logic (not illustrated) used to make the comparison between various hash representations and identify an email message related to each hash representation as part of a phishing campaign.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, malicious message identification logic 110, hashing logic 112, recipient data request logic 114, and message action logic 116 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to the instructions. In other words, the figure may represent the manner in which programmers or software developers organize and arrange source code for later compilation into an executable, or interpretation into bytecode or the equivalent, for execution by the security computing device 108.

Account provider computing device 120 provides a messaging account to sending computing device 104. In an embodiment, account provider computing device 120 may also provide a messaging account to client computing device 102. For example, account provider computing device 120 may provide an instant messaging service which allows a first user with an account provided by account provider computing device 120 to exchange messages with a second user with an account provided by account provider computing device 120. Additionally or alternatively, client computing device 102 may have a messaging account provided by an account provider separate from account provider computing device 120. For example, account provider computing device 120 may provide an email account to sending computing device 104 while client computing device 102 is provided an email account from a different account provider.

In an embodiment, account provider computing device 120 provides account information to security computing device 108. For example, security computing device 108 may request information regarding an account from which the electronic digital message 106 was sent. Account provider computing device 120 may send the request information to security computing device 108. In some embodiments, actions performed by account provider computing device 120 and security computing device 108 are performed by the same computing device. For example, an account provider computing device 120 which provides accounts to both the sending computing device 104 and the client computing device 102 may monitor messages received by the client computing device 102 to determine if the sending account is a possible phishing account. Additionally or alternatively, the client computing device 102 may compare messages received by the client computing device 102 to known phishing messages to determine if the messages are part of phishing campaigns, using hashing methods described in other sections herein.

In an embodiment, recipient account data source 130 provides data identifying a plurality of recipient accounts to security computing device 108. For example, recipient account data source may store a list of known recipient accounts. In response to receiving a request from security computing device 108, the recipient account data source may send the list of known recipient accounts to security computing device 108.

Figure 2:
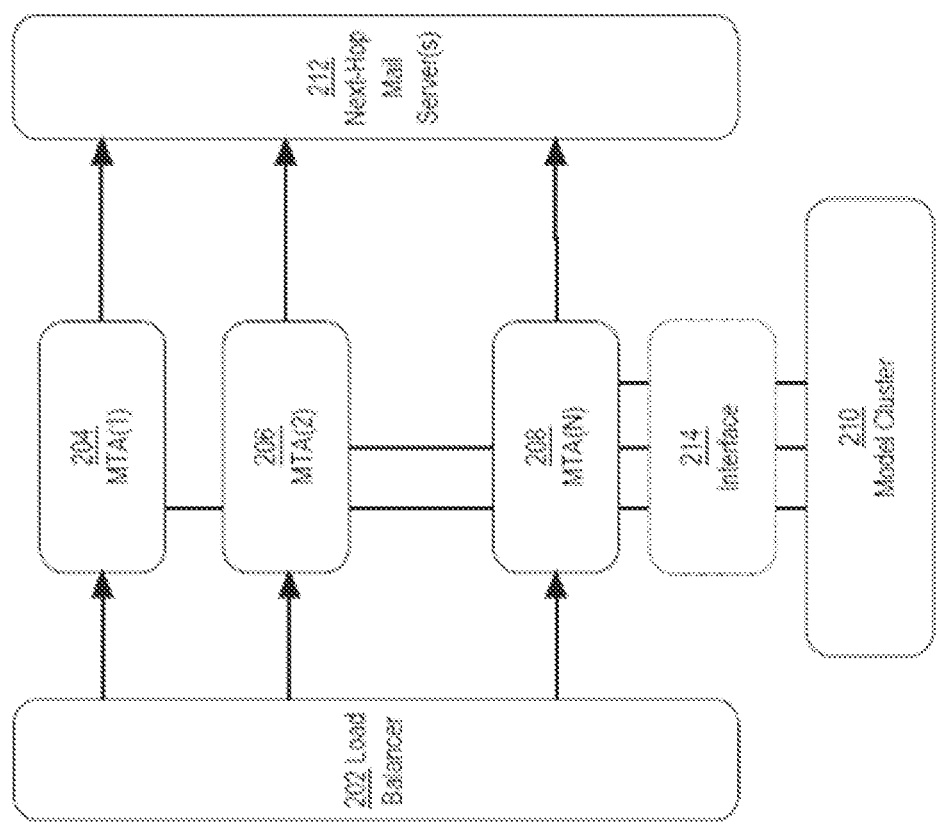
FIG. 2 is a schematic depiction of a portion of the distributed computing system of FIG. 1, in an embodiment.

FIG. 2 is a schematic depiction of a portion of the distributed computing system of FIG. 1, in an embodiment. A network 200 includes network devices 202, 212. Network device 202 is illustratively a load balancer while network device 212 is a next-hop server such as a mail server. Network 200 may be a portion of network 100, described above.

Any number N of message transfer applications or agents (MTAs) 204, 206, 208 are interposed between network devices 202, 212. In an embodiment, electronic messages that are in transit from network device 202 to network device 212 are processed by one or more of MTAs 204, 206, 208 prior to delivery to network device 212. A message scanning application operated by an MTA 204, 206, 208 is programmed to perform stateless security scanning of messages received from network device 202 and prior to transmission of the messages to network device 212.

In an embodiment, interface 214 is interposed between the MTAs 204, 206, 208 and a model cluster 210. However, portions of interface 214 may be implemented within an MTA 204, 206, 208. An example of interface 214 is an application program interface (API).

Model cluster 210 may be implemented in main memory, disk storage, or other digital electronic storage on account provider computing device 120, client computing device 102, and security computing device 108 and may include one or more machine learning-based model(s) that may be selectively engaged and disengaged by interface 214 for use in connection with the stateless scanning performed by the MTAs 204, 206, 208. In an embodiment, model cluster 210 is programmed with machine learning-based models(s) used by MTAs 204, 206, 208 for many different types of message classification, including classification as spam, classification as legitimate message, classification as phishing, spoofing, or malicious, and classification according to characteristics of the message text, such as any one or more of the message text characteristics described herein. In an embodiment, the computer(s) 120, 102, 108 used to host model cluster 210 are stateless model servers.

Models in model cluster 210 are programmed using, for example, one or more text-based classification modeling approaches, such as logistic regression, random forests, gradient-boosted trees, neural networks, and deep neural networks. For instance, model cluster 210 may include models created using different modeling approaches or may include models all created using the same modeling approach but with different training data.

Interface 214, when executed by a processor, is programmed to control the selective engagement of security computing device(s) 108 by client computing device(s) 102 in tasks performed by, or requested by, message transfer application 204, 206, or 208. The programming of interface 214 manages and facilitates electronic communications of data and instructions between client computing device(s) 102 and security computing device(s) 108 during the handling by message transfer application 204, 206, or 208 of electronic messages and their respective attachments, for example messages that are being transmitted from sending computing device 104 to client computing device 102, or from client computing device 102 to sending computing device 104, over network 100. Interface 214 is shown as a separate component in FIG. 2 but all or portions of interface 214 may be implemented as part of message transfer application 204, 206, or 208. Alternatively, or in addition, some portions of interface 214 may be implemented on security computing device(s) 108.

3. Functional Over View 3.1 Phishing Message Detection

Figure 3:
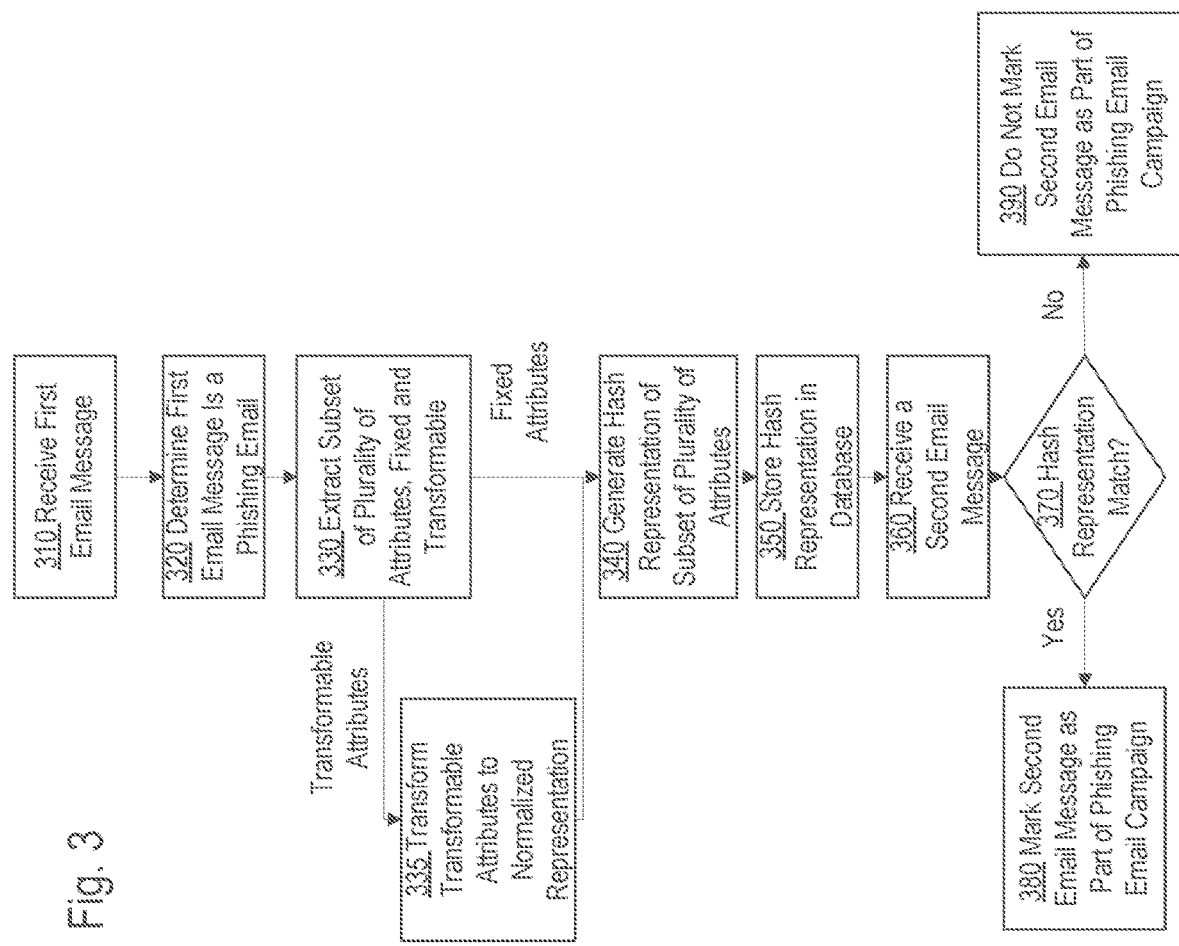
FIG. 3 illustrates an example computer-implemented process for identifying phishing email campaigns.

FIG. 3 illustrates an example computer-implemented process for identifying phishing email campaigns. The flow diagram shown in FIG. 3 is intended as an illustration at the functional level at which skilled persons, in the art to which this disclosure pertains, communicate with one another to describe and implement algorithms using programming. The flow diagram is not intended to illustrate every instruction, method object or sub-step that would be needed to program every aspect of a working program, but are provided at the same functional level of illustration that is normally used at the high level of skill in this art to communicate the basis of developing working programs.

Referring again to FIG. 3, in an embodiment, a computer-implemented method starts execution at step 310 at which a first email message is received. The first email message may be received, for example, by security computing device 108 or by client computing device 102, or the first email message may first go to the security computing device 108.

At step 320, the method is programmed to determine that the first email message is a phishing email message. Step 320 may be executed using one or more email detection computers, which may be independent or associated with computers 102, 108, using the methods of one or more of U.S. Patent Application Pub. Nos. 2018/0278627, 2016/0119376, and 2018/62669660. If the first email message is determined not to be a phishing email message, then the first email message may be sent to the client computing device 102.

At step 330, a subset of a plurality of attributes are extracted from the first email message. The subset of the plurality of attributes may include, for example, fixed and transformable attributes. In an embodiment, the fixed and transformable attributes are treated differently. Fixed attributes are attributes of an email which do not need normalization. Fixed attributes may be defined through machine learning or other pattern-recognition methods that determine that an attribute indicates two or more malicious phishing emails being part of the same campaign. Examples of fixed attributes may include a thread count, an attachment count, a TO recipient count, and a BCC recipient count. Fixed attributes also may be a number of URLs within the body of the first email message and one or more of a number of links within the body of the first email message.

The transformable attributes are attributes of an email which are subject to normalization. The transformable attributes also may be defined through machine learning or other pattern-recognition methods that determine that an attribute indicates two or more malicious phishing email messages being part of the same campaign, and further that the attribute is one commonly subject to slight alterations. Examples of transformable attributes include attributes in the form of email addresses, and specific URLs and/or links. The normalization of attributes in the form of email addresses may include a process of removing a username before the domain name or everything before the "@" symbol, or may involve replacing the entire email address with an "@" symbol. The normalization of URLs and/or links may include identifying a page component and a query component and replacing the page component with a placeholder value which may be an extension matching the extension found in the URLs and/or links and replacing the query component with another placeholder value which may be a fixed string, such as "k=v."

After the transformable attributes are normalized, at step 340, a hash representation is generated for the subset of the plurality of attributes. The hash representation may be created by algorithms that convert an input data array of a certain type and an arbitrary length to an output bit string of a fixed length, resulting in a uniform message that is easily compared. For example, one-way hash algorithms such as SHA-256 can be used. The hash representation can be stored in a database associated with the security computing device 108 or the client device 102 for use in evaluation of future emails.

At step 360, the method receives a second email message. A subset of attributes may be hashed by executing, over the subset of attributes, the same hash algorithm that was used for the first email message, creating a second hash representation which may be compared to the first hash representation that was stored in the database. The subset of attributes may be the same set of attributes as the attributes that were hashed for the first email. The attributes which were characterized as transformable for the first email message also are characterized as transformable for the second email message. The attributes which were characterized as fixed for the first email message also are characterized as fixed for the second email message.

In an embodiment, step 360 may involve hashing the attributes of the first and second emails in the same sequence. For example, if a link is hashed first in the first email message, then the link also is hashed first in the second email message. Because one-way hash algorithms are deterministic, categorizing the same attributes in the same way, and/or executing the same hash algorithm over the same set of attributes will yield hash representations for both the first and second email messages that are the same when the normalized attributes are the same. Therefore, the method can accurately compare the two hashed representations and rapidly detect messages that are semantically or functionally similar even when the original message content is different.

In some embodiments, attributes can be concatenated in a particular order to optimize computational performance, rather than using an order in which particular attributes appear in an email message. For example, shorter attributes may be concatenated before longer attributes, or longer attributes may be concatenated before shorter attributes. Additionally or alternatively, reordering may be based on alphabetization of the attributes. Determinations of ordering to optimize computational performance may be made using, for example, machine learning algorithms.

At step 370, the method compares the hash representation of the second email message to the hash representation of the first email message. If the two hash representations match, at step 380, then the second email message is marked as part of the phishing email campaign. If, however, the hash representations do not match, then at step 390, the second email message is not marked as part of the phishing email campaign.

3.2 Other Responsive Actions

In an embodiment, after the second email message has been marked as part of the phishing email campaign at step 380, the security computing device 108 may be programmed to execute one or more responsive actions, for example, using message action logic 116. The responsive actions may be programmed as an automatic response to any email that is designated as a phishing email, or may follow protocols set for messages possessing particular indicators. Possible responsive actions include but are not limited to blocking forwarding of the email message, moving the email message to a quarantine, transmitting an alert toward the email account first designated as part of the email campaign, and dropping or deleting the phishing email message. For example, a recipient account may receive a message from the security computing device 108 that an email message has been blocked because it was designated as part of a malicious email campaign.

3.3 Attribute Processing

In an embodiment, the process of hashing may involve concatenating both the fixed attributes and the normalized representations of the transformable attributes into a string representation before generating the hash representation based on the concatenated string representation. The fixed attributes and the transformable attributes used to create the hash representation may be a subset of various attributes associated with the email message.

In an embodiment, the hash representation may be created by calculating a one-way hash value over a subset of the attributes of a message based on the fixed attributes and normalized representations of the transformable attributes, wherein the one-way hash value cannot revert back to the original input value and slight changes to the original input value completely alters the resulting hash value.

In an embodiment, the fixed attributes may include a thread count, an attachment count, a TO recipient count, a CC recipient count, a number of URLs within a body of the phishing email message, a number of links within the body of the email message, or a BCC recipient count. The thread count represents the total number of replies to the original email message, which email may be part of a chain representing a long conversation with many replies to the originally-sent email. The attachment count represents the number of attachments sent in an email. The TO, CC, and BCC recipient counts are all values representing the number of email addresses input to the header of the email, or the number of recipients, both visible and not, to intended recipients, as designated by their placement in the TO, CC, and BCC lines of the email message. The number of URLs and/or number of links within a body of an email message represent the number of links in an email message, which may include, for example, clickable links and other links that hold remote resources for the email such as an image or logo. Most email messages are formatted in HTML, along with a fallback text version. Both formats may be parsed to find links that could be clicked or copied pasted into a browser, and the total count of these is used.

In an embodiment, one of the fixed attributes of the phishing email message may be an SMTP FROM value, which SMTP FROM value may be identified from a SMTP field. The SMTP is a Simple Mail Transfer Protocol. The SMTP FROM value represents the actual sender account. Unlike a FROM value in the email header and within the body of an email, the SMTP FROM value cannot be changed or masked without changing the account from which an email is sent. Thus, the SMTP FROM value cannot be easily faked. Emails have both an SMTP FROM address and a FROM address in the body.

In an embodiment, the transformable attributes may be attributes which are altered across different instances of the same phishing email campaign. One example of a transformable attribute within an email may be the values within the subject field in the header of the email. In some embodiments, the values within the subject field are normalized. In some embodiments, all digits in the subject field may be replaced with a placeholder digit "1" (or any other arbitrary number or symbol). For example, if the subject line includes "Invoice #2864," then the numbers may all replaced by "1," such that the normalized version reads "Invoice #1111." In an embodiment, normalization of email addresses executes by replacing the email addresses with an arbitrary placeholder value. As a specific example, "Message for bob@examplecorp.com" can be replaced with "Message for @."

Transformable attributes may also use approximate values. For example, an attribute may be an approximate URL/link value. To normalize such a value, for each link, the method may remove the "path" component, and replace all "page" components and "query" components with a placeholder value. In some embodiments, the domain name may also be removed. The page component may be replaced with the extension as a placeholder (i.e. "index.html" becomes ".html). Query components may be replaced with a fixed string (i.e. "page=1&item=42" is replaced by "k=v"). So, for a link that appears as "http://domain.com/some/path.php?user=true," the normalized value would be "http:////.php?k=v." Approximate attachment names are another example of a transformable attribute that may be one of a subset of attributes used for hashing of an email message. For each attachment, the method may remove the file name but preserve the extension. Thus, "Invoice_4521.xls" would become ".xls."

In some embodiments, one transformable attribute may be an HTML content, which may be transformed into an HTML structure value to be used in a hash representation associated with an email message. The HTML structure value may be generated from raw HTML content by keeping the HTML tags and attribute names associated with the HTML tags, while stripping all data between the HTML tags. Examples of the data that is stripped include visible text and/or other data that can be changed from email to email. Transforming raw HTML content to HTML structure value, as described herein, is particularly helpful since some phishing campaigns include targeted email messages that have a user's name, email address, and/or company name to make the email messages seem more legitimate. An example of raw HTML content may look as follows:

```
<html>
<title>Message</title>
<body>
 <p>
   Hey, John Smith<br>
   Hope all is well<br>
   Click this link <a href="http://google.com">Google</a>
 </p>
</body>
</html>
```

An example of an HTML structure value transformed from the raw HTML content may look like the following:

```
<html>
<title></title>
<body>
 <p>
   <br>
   <br>
   <a href=""></a>
 </p>
</body>
</html>
```

The full normalized representation, or HTML structure value, may be presented as: <html><title></title><body><p><br><br><a href=" "></a></p></body></html>. This leaves the attribute names without leaving the attribute values, which remaining attribute names can then be used in a hash representation using processes described elsewhere in the present disclosure.

The disclosed method may involve only a few of the described attributes, many or all of the described attributes, or only or additionally transformable and fixed attributes not described. These different combinations of attributes used in hashing of the email messages allows for flexibility of campaign detection programs as methods used by creators of phishing campaigns evolve.

In some embodiments, all attributes which are part of the combination of attributes are identified, and normalized if necessary, before being concatenated together to create an identifying set of features for an email message. A system or computer-implemented method can then track and identify feature sets for all email messages as the email messages are being scanned and processed.

In some embodiments, a system or computer-implemented method maintains a lookup table of all identifying feature sets of all phishing emails detected with other algorithms. The lookup table stores a set of phishing and malicious emails that have been previously detected, represented by their identifying set of features. The system or method may be programmed to match incoming email messages against the lookup table and automatically flag matching email as members of a phishing campaign. In some embodiments, the system or method may then block these emails from being delivered or optionally add an additional email header so that downstream email processing systems can discard it. In some embodiments, identifying features are hashed with a non-cryptographic hash function for easy lookup and comparison.

The approach of hashing of particular sections of an email message, as described above, is applicable both to email messages designated as phishing emails on their own through other processes and email messages designated as phishing emails only after hashing and comparison.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
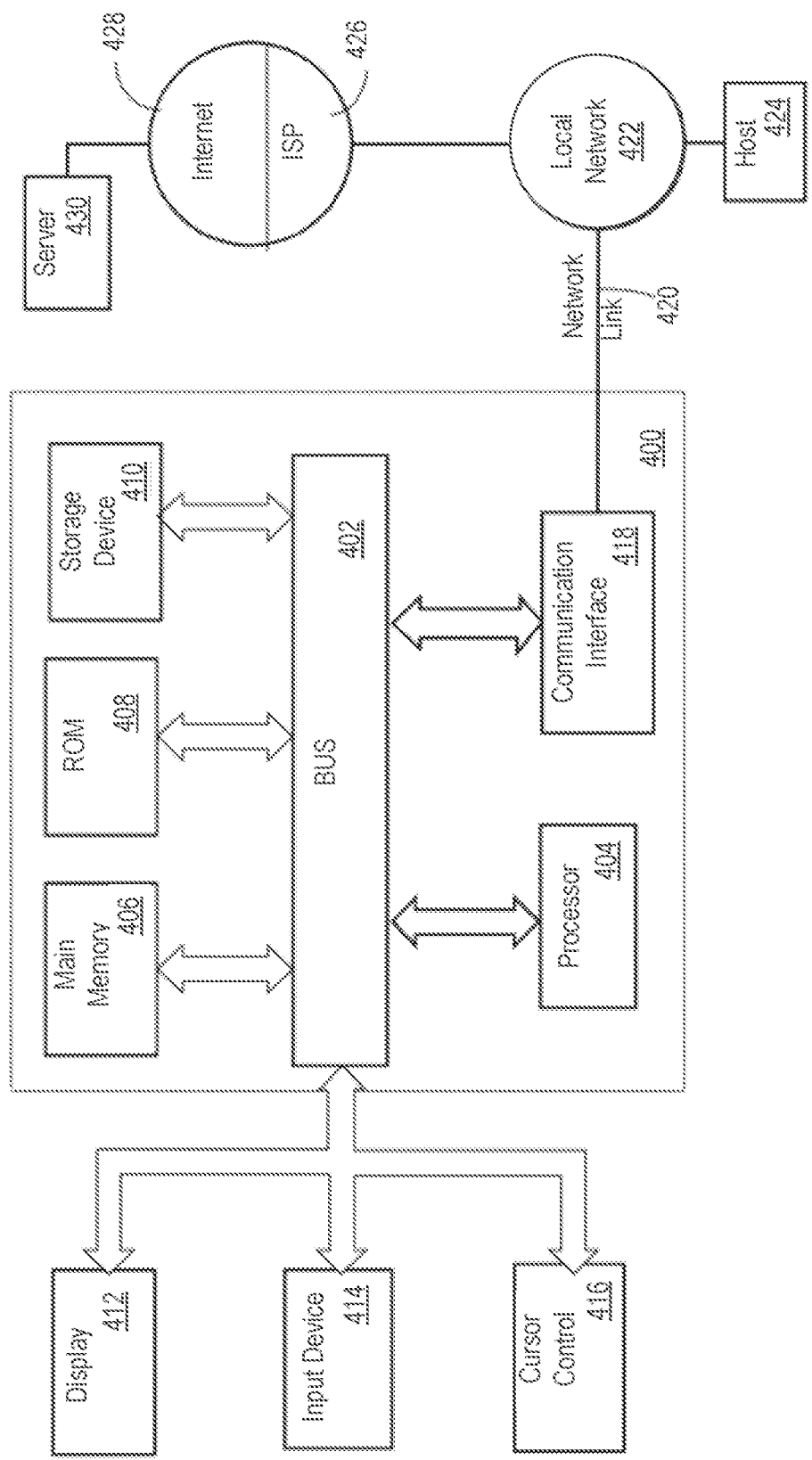
FIG. 4 illustrates a computer system with which one embodiment could be implemented.

FIG. 4 is a block diagram that illustrates an example computer system with which an embodiment may be implemented. In the example of FIG. 4, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IOT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem

402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of the instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed by one or more email detection computers, the method comprising:

receiving, from a digital electronic computer network, a first email message that is directed to a first recipient account from a first sender account, the first email message being associated with a plurality of attributes;

determining that the first email message is a phishing email;

extracting, from the first email message, a subset of the plurality of attributes, the subset of the plurality of attributes comprising a plurality of fixed attributes and a plurality of transformable attributes;

transforming each particular transformable attribute of the plurality of transformable attributes to a normalized representation of that particular transformable attribute;

generating a hash representation of the subset of the plurality of attributes based on the plurality of fixed attributes and the normalized representations of the plurality of transformable attributes;

storing the hash representation of the subset of the plurality of attributes of the first email message in a database;

receiving, from the digital electronic computer network, a second email message that is directed to a second recipient account from a second sender account;

determining that the second email message is a phishing email based on the hash representation corresponding to the first email message.

2. The method of claim 1, further comprising, in response to determining that the second email message is a phishing email based on the hash representation corresponding to the first email message, executing a particular responsive action from among a plurality of responsive actions comprising blocking forwarding the second email message, moving the second email message to quarantine, transmitting an alert toward the first recipient account, dropping or deleting the second email message.

3. The method of claim 1, further comprising:

extracting, from the second email message, a second subset of the plurality of attributes, the second subset of the plurality of attributes comprising a second plurality of fixed attributes and a second plurality of transformable attributes;

transforming each particular transformable attribute of the second plurality of transformable attributes to a second normalized representation of that particular transformable attribute;

generating a second hash representation of the second subset of the second plurality of attributes based on the second plurality of fixed attributes and the second normalized representations of the second plurality of transformable attributes;

comparing the second hash representation of the second subset of the second plurality of attributes corresponding to the second email message with the hash representation corresponding to the first email message.

4. The method of claim 1, one of the plurality of fixed attributes of the first email message being an SMTP FROM value, wherein the SMTP FROM value is identified from a SMTP FROM field.

5. The method of claim 1, the plurality of fixed attributes of the first email message being two or more of a thread count; an attachment count; a TO recipient count; a CC recipient count; a number of URLs within a body of the first email message; a number of links within the body of the first email message; or a BCC recipient count.

6. The method of claim 1, one of the plurality of transformable attributes being a subject line value, and the method further comprising transforming the subject line value to the normalized representation by one or more of:

replacing digits in the subject line value with a replacement digit; or replacing a username of an email address in the subject line value with a replacement username.

7. The method of claim 1, one of the plurality of transformable attributes being a URL value, and the method further comprising transforming the URL value to a normalized representation by one or more of:

removing a path component associated with the URL value;

replacing a page component associated with the URL value with a replacement page component; or replacing a query component associated with the URL value with a replacement query component.

8. The method of claim 1, one of the plurality of transformable attributes being an attachment name, and the method further comprising transforming the attachment name to a normalized representation by removing a file name associated with the attachment name.

9. The method of claim 1, further comprising concatenating the plurality of fixed attributes and the normalized representations of the plurality of transformable attributes into a string representation and generating the hash representation based on the concatenated string representation.

10. The method of claim 1, further comprising generating the hash representation by calculating a one-way hash value over the subset of the plurality of attributes based on the plurality of fixed attributes and the normalized representations of the plurality of transformable attributes.

11. A computer-implemented method for identifying phishing emails from a malicious email campaign, the method comprising, executed by one or more email detection computers:

receiving, from a digital electronic computer network, a first email message that is directed to a first recipient account from a first sender account, the first email message being associated with a plurality of attributes;

determining that the first email message is a phishing email;

extracting, from the first email message, a subset of the plurality of attributes, the subset of the plurality of attributes comprising a plurality of fixed attributes and a plurality of transformable attributes;

transforming each of the plurality of transformable attributes to a normalized representation of the transformable attribute;

generating a hash representation of the subset of the plurality of attributes based on the plurality of fixed attributes and the normalized representations of the plurality of transformable attributes;

storing the hash representation of the subset of the plurality of attributes of the first email message in a database;

receiving, from the digital electronic computer network, a second email message that is directed to a second recipient account from a second sender account;

determining that the second email message is a phishing email based on the hash representation corresponding to the first email message and by:

extracting, from the second email message, a second subset of the plurality of attributes, the second subset of the plurality of attributes comprising a second plurality of fixed attributes and a second plurality of transformable attributes;

transforming each particular transformable attribute of the second plurality of transformable attributes to a second normalized representation of that particular transformable attribute;

generating a second hash representation of the second subset of the second plurality of attributes based on the second plurality of fixed attributes and the second normalized representations of the second plurality of transformable attributes;

comparing the second hash representation of the second subset of the second plurality of attributes corresponding to the second email message with the hash representation corresponding to the first email message;

in response to determining that the second email message is the phishing email based on the hash representation corresponding to the first email message, executing a particular responsive action from among a plurality of responsive actions comprising blocking forwarding the second email message, moving the second email message to a quarantine, transmitting an alert toward the first recipient account, dropping or deleting the second email message.

12. One or more computer-readable non-transitory storage media including instructions that, when executed by one or more processors, are configured to cause the one or more processors to:

receive, from a digital electronic computer network, a first email message that is directed to a first recipient account from a first sender account, the first email message being associated with a plurality of attributes;

determine that the first email message is a phishing email;

extract, from the first email message, a subset of the plurality of attributes, the subset of the plurality of attributes comprising a plurality of fixed attributes and a plurality of transformable attributes;

transform each particular transformable attribute of the plurality of transformable attributes to a normalized representation of that particular transformable attribute;

generate a hash representation of the subset of the plurality of attributes based on the plurality of fixed attributes and the normalized representations of the plurality of transformable attributes;

store the hash representation of the subset of the plurality of attributes of the first email message in a database;

receive, from the digital electronic computer network, a second email message that is directed to a second recipient account from a second sender account;

determine that the second email message is a phishing email based on the hash representation corresponding to the first email message.

13. The one or more non-transitory computer-readable storage media of claim 12 storing instructions which, when executed by the one or more processors, further cause:

in response to determining that the second email message is a phishing email based on the hash representation corresponding to the first email message, executing a particular responsive action from among a plurality of responsive actions comprising blocking forwarding the second email message, moving the second email message to a quarantine, transmitting an alert toward the first recipient account, dropping or deleting the second email message.

14. The one or more non-transitory computer-readable storage media of claim 12 storing instructions which, when executed by the one or more processors, further cause:

extracting, from the second email message, a second subset of the plurality of attributes, the second subset of the plurality of attributes comprising a second plurality of fixed attributes and a second plurality of transformable attributes;

transforming each particular transformable attribute of the second plurality of transformable attributes to a second normalized representation of that particular transformable attribute;

generating a second hash representation of the second subset of the second plurality of attributes based on the second plurality of fixed attributes and the second normalized representations of the second plurality of transformable attributes;

comparing the second hash representation of the second subset of the second plurality of attributes corresponding to the second email message with the hash representation corresponding to the first email message.

15. The one or more non-transitory computer-readable storage media of claim 12, wherein one of the plurality of fixed attributes of the first email message is an SMTP FROM value, wherein the SMTP FROM value is identified from a SMTP FROM field.

16. The one or more non-transitory computer-readable storage media of claim 12, wherein one of the plurality of fixed attributes of the first email message being two or more of a thread count; a TO recipient count; a number of URLs within a body of the first email message; a number of links within the body of the first email message; or a BCC recipient count.

17. The one or more non-transitory computer-readable storage media of claim 12, wherein one of the plurality of transformable attributes is a subject line value, and storing instructions which, when executed by one or more processors, further cause transforming the subject line value to the normalized representation by one or more of:

replacing digits in the subject line value with a replacement digit; or replacing a username of an email address in the subject line value with a replacement username.

18. The one or more non-transitory computer-readable storage media of claim 12, wherein one of the plurality of transformable attributes is a URL value, and storing instructions which, when executed by the one or more processors, further cause transforming the URL value to a normalized representation by one or more of:

removing a path component associated with the URL value;

replacing a page component associated with the URL value with a replacement page component; or replacing a query component associated with the URL value with a replacement query component.

19. The one or more non-transitory computer-readable storage media of claim 12, wherein one of the plurality of transformable attributes is an attachment name, and storing instructions which, when executed by the one or more processors, further cause transforming the attachment name to a normalized representation by removing a file name associated with the attachment name.

20. The one or more non-transitory computer-readable storage media of claim 12 storing instructions which, when executed by the one or more processors, further cause:

concatenating the plurality of fixed attributes and the normalized representations of the plurality of transformable attributes into a string representation and generating the hash representation based on the concatenated string representation.

* * * * *